(12) United States Patent
Faisal et al.

(10) Patent No.: US 10,661,736 B2
(45) Date of Patent: May 26, 2020

(54) MOLTEN METAL ANODE SOLID OXIDE FUEL CELL FOR TRANSPORTATION-RELATED AUXILIARY POWER UNITS

(71) Applicants: Saudi Arabian Oil Company, Dhahran (SA); Alfaisal University, Riyadh (SA)

(72) Inventors: Nadimul Haque Faisal, Aberdeen (GB); Rehan Ahmed, Edinburgh (GB); Mattheus F. Goosen, Riyadh (SA); Sai P. Katikaneni, Dhahran (SA); Stamatios Souentie, Dhahran (SA)

(73) Assignees: Saudi Arabian Oil Company, Dhahran (SA); Alfaisal University, Riyadh (SA)

( * ) Notice: Subject to any disclaimer, the term of this patent is extended or adjusted under 35 U.S.C. 154(b) by 807 days.

(21) Appl. No.: 15/158,637

(22) Filed: May 19, 2016

(65) Prior Publication Data
US 2017/0334379 A1    Nov. 23, 2017

(51) Int. Cl.
*B60R 16/033*   (2006.01)
*H01M 8/243*    (2016.01)
(Continued)

(52) U.S. Cl.
CPC ....... *B60R 16/033* (2013.01); *B60H 1/00428* (2013.01); *H01M 4/905* (2013.01);
(Continued)

(58) Field of Classification Search
CPC ............. H01M 8/0271; H01M 8/0278; H01M 8/04007; H01M 8/04014; H01M 8/1233;
(Continued)

(56) References Cited

U.S. PATENT DOCUMENTS

| 3,959,013 A | * | 5/1976 | Breiter | ................ H01M 2/0265 |
| | | | | 429/185 |
| 4,520,082 A | * | 5/1985 | Makiel | .............. H01M 8/04014 |
| | | | | 429/460 |

(Continued)

FOREIGN PATENT DOCUMENTS

CN    103972526 A    8/2014

OTHER PUBLICATIONS

Tao, T. et al., Liquid Tin Anode Solid Oxide Fuel Cell for Direct Carbonaceous Fuel Conversions; ECS Transactions; Jan. 1, 2007; pp. 463-472; vol. 5.

(Continued)

*Primary Examiner* — Amy Cohen Johnson
*Assistant Examiner* — Paul D Baillargeon
(74) *Attorney, Agent, or Firm* — Dinsmore & Shohl LLP

(57) ABSTRACT

A vehicular power system, a vehicle and a method of providing auxiliary power to a vehicle using an auxiliary power unit that uses a molten metal anode solid oxide fuel cell rather than an internal combustion engine. The auxiliary power unit includes a container with numerous fuel cells disposed within it such that when the metal anode is heated, the metal converts to a molten state that can be electrochemically cycled between oxidized and reduced states by oxygen and a fuel present in the molten metal, respectively. The auxiliary power unit further includes a furnace that selectively provides heat to the fuel cells in order to place the anode into its molten metal state. Seals may provide fluid isolation between the molten metal within the container and the ambient environment.

15 Claims, 3 Drawing Sheets

(51) Int. Cl.
*H01M 8/0276* (2016.01)
*H01M 8/04007* (2016.01)
*H01M 8/2455* (2016.01)
*H01M 8/0271* (2016.01)
*H01M 8/1233* (2016.01)
*B60H 1/00* (2006.01)
*H01M 8/0297* (2016.01)
*H01M 8/2404* (2016.01)
*H01M 8/0273* (2016.01)
*H01M 8/04014* (2016.01)
*H01M 8/1246* (2016.01)
*H01M 8/22* (2006.01)
*H01M 4/90* (2006.01)
*H01M 4/86* (2006.01)
*H01M 8/124* (2016.01)

(52) U.S. Cl.
CPC ....... *H01M 8/0271* (2013.01); *H01M 8/0278* (2013.01); *H01M 8/04007* (2013.01); *H01M 8/04014* (2013.01); *H01M 8/1233* (2013.01); *H01M 8/1246* (2013.01); *H01M 8/22* (2013.01); *H01M 8/243* (2013.01); *H01M 8/2455* (2013.01); *H01M 8/0273* (2013.01); *H01M 8/0276* (2013.01); *H01M 8/0297* (2013.01); *H01M 8/2404* (2016.02); *H01M 2004/8684* (2013.01); *H01M 2008/1293* (2013.01); *H01M 2250/20* (2013.01); *Y02E 60/525* (2013.01); *Y02T 90/32* (2013.01)

(58) Field of Classification Search
CPC ...... H01M 8/1246; H01M 8/22; H01M 8/243; H01M 8/2455; H01M 2004/8684; H01M 2008/1293; H01M 2250/20; H01M 4/905; H01M 8/0258; H01M 8/0274; H01M 8/0297; H01M 8/0273; H01M 8/0276; H01M 8/2404; B60R 16/033; B60H 1/00428; Y02E 60/525; Y02T 90/32
See application file for complete search history.

(56) References Cited

U.S. PATENT DOCUMENTS

| | | | |
|---|---|---|---|
| 5,741,605 A * | 4/1998 | Gillett | H01M 8/0625 429/415 |
| 6,692,861 B2 | 2/2004 | Tao | |
| 8,518,598 B1 | 8/2013 | Yamanis | |
| 9,269,980 B2 | 2/2016 | Momiyama et al. | |
| 2002/0110716 A1* | 8/2002 | Holmes | H01M 8/2465 429/408 |
| 2006/0234098 A1 | 10/2006 | Gur | |
| 2009/0117429 A1 | 5/2009 | Zillmer et al. | |
| 2010/0159295 A1* | 6/2010 | Wolk | H01M 8/0252 429/431 |
| 2011/0014526 A1 | 1/2011 | Gur | |
| 2011/0246013 A1* | 10/2011 | Yee | B60L 11/1859 701/22 |
| 2011/0311900 A1 | 12/2011 | Blake et al. | |
| 2012/0231366 A1 | 9/2012 | Wachsman et al. | |
| 2015/0044598 A1 | 2/2015 | Lee et al. | |
| 2015/0311545 A1 | 10/2015 | Souentie et al. | |
| 2016/0020472 A1* | 1/2016 | Taylor | H01M 8/2475 429/508 |
| 2018/0331385 A1* | 11/2018 | Hickey | H01M 8/249 |

OTHER PUBLICATIONS

International Search Report and Written Opinion dated Aug. 23, 2017 pertaining to International Application No. PCT/US2017/033232.
Brodrick et al., "Evaluation of Fuel Cell Auxiliary Power Units for Heavy-Duty Diesel Trucks", Transportation Research Part D, 2002, 303-315, 7, Elsevier Science Ltd.
Greisen, "Fuel Cell Auxiliary Power Units for Heavy Duty Truck Anti-Idling", Aug. 28, 2014, Topsoe Fuel Cell.
McPhee et al., "Demonstration of a Liquid-Tin Anode Solid-Oxide Fuel Cell (LTA-SOFC) Operating from Biodiesel Fuel", Energy Fuels, 2009, 5036-5041, 23, American Chemical Society.
Stoffa et al., "Liquid Tin Anode Direct Coal Fuel Cell-CellTech Power", The Energy Lab, Feb. 2012, National Energy Technologies Laboratory.

* cited by examiner

MOLTEN METAL ANODE SOLID OXIDE FUEL CELL FOR TRANSPORTATION-RELATED AUXILIARY POWER UNITS

BACKGROUND

The present disclosure relates to advanced anode materials to permit the use of direct (i.e., unreformed) hydrocarbons as a fuel for a solid oxide fuel cell (SOFC). More specifically, the present disclosure relates to a molten metal anode (MMA)-based SOFC (MMA-SOFC) that can be used for transportation auxiliary power units (APUs).

APUs are useful as a way to provide supplemental power in heavy-duty transportation operations. One notable example is their use on tractor-trailers and related commercial vehicles in response to increased scrutiny over excessive main engine idling during extended stopover periods. In one conventional form, the APU is configured as a small internal combustion engine (ICE) that in addition to providing heat can also supply electrical power through a suitable generator in order to operate various electrical systems within the vehicle during these extended periods where the main engine is turned off. While useful for their intended purpose, such APUs problematically consume relatively large amounts of fossil fuels. Moreover, they present maintenance issues; this latter concern is particularly problematic when they do not get repaired after a failure, in that the operator of the vehicle reverts to the old method of running the vehicle's motive power unit (i.e., main engine) at idle as a way to satisfy auxiliary power needs.

Fuel cells convert a fuel into usable energy via its electrochemical reaction rather than by its combustion. As such—and in addition to having fewer failure-prone mechanical parts—fuel cells have several environmental advantages over ICEs and related power-generating sources. Within the realm of fuel cell-based power systems, SOFCs are particularly beneficial in that they take advantage of their ability to provide direct utilization of carbon-containing fuels without the need to provide significant reformation of the fuel in ways that other fuel cell configurations—such as proton exchange membrane or polymer electrolyte membrane (in either event, PEM)—cannot.

In one form, the anode of the SOFC may be made up of a fuel-containing molten metal such that upon introduction of an oxygen-bearing reactant (for example, air) to the cell's cathode, oxygen ions created at the cathode migrate through the solid electrolyte to the molten metal and ionized fuel at the anode. One significant advantage of using a molten metal anode over its solid counterpart is that most harmful emissions (typically in the form of $CO_2$, $SO_2$, $NO_X$ and particulate matter) that would otherwise be vented to the ambient environment can be captured. Unfortunately, having one of the fuel cell components be in a liquid-like state has resulted in significant handling problems, especially as it relates to fuel cell configurations that may be contemplated for mobile applications.

SUMMARY

Despite the shortcomings mentioned above, the present inventors have discovered that using MMA-SOFCs as a power source for vehicle-based APUs can solve the problems associated with main engine idling while providing improved performance relative to not only ICEs, but other forms of fuel cells as well. According to one embodiment of the present disclosure, a vehicular power system includes a motive power unit and an APU the latter of which includes a container with an SOFC fuel cell disposed within it, as well as electrical circuitry cooperative with the fuel cell such that electric current produced by the operation of the fuel cell can be delivered to a vehicular load. The fuel cell is made up of numerous half-cells that in turn are made up of a cathode and a solid electrolyte. In addition to the various half-cells, the fuel cell includes an anode that is disposed adjacent at least a portion of the electrolyte of the half-cells. In this way, air or a related oxygen-bearing reactant flows through the cathode and the electrolyte of the numerous half-cells to electrochemically react with a fuel that is contained within a bath of the liquid metal anode. The APU further includes a furnace that may be made up of one or more heating elements placed in direct or indirect heat exchange with the container or individual half-cells in order to selectively provide heat to the in order to place the anode into its substantially molten metal state during APU operation.

According to another embodiment of the present disclosure, a vehicle is made up of a platform with a wheeled chassis, a guidance apparatus (such as one or more of a steering, braking and acceleration mechanism) cooperative with the wheeled chassis and a passenger compartment that is thermally cooperative with a climate control system. The vehicle also includes a motive power unit and an APU, both secured to the platform. As before, the APU includes a container, an SOFC fuel cell, furnace and electrical circuitry, in addition to also having one or more of an electrical generator or alternator and a processor-based controller.

According to yet another embodiment of the present disclosure, a method of providing auxiliary power to a vehicle that comprises a motive power unit and an APU is disclosed. The method includes operating a furnace to provide heat to the APU that is made up of a fuel cell that is situated within a container that is mounted to the vehicle. The heat produced by the furnace is sufficient to ensure that an anode portion of the fuel cell is in a molten state to facilitate one or more electrochemical reactions at the anode when an oxygen-bearing reactant flows through the cathode and a solid electrolyte of numerous half-cells. The electrical current that is generated within the fuel cell can be used to supply electrical power to various loads, such as a climate control system, lighting, information or entertainment devices, appliances or other equipment situated on the vehicle.

Although the concepts of the present disclosure are described herein with primary reference to certain specific fuel cell system configurations, it is contemplated that the concepts are not so limited, and as such are applicable to any SOFC system for transportation-based use.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
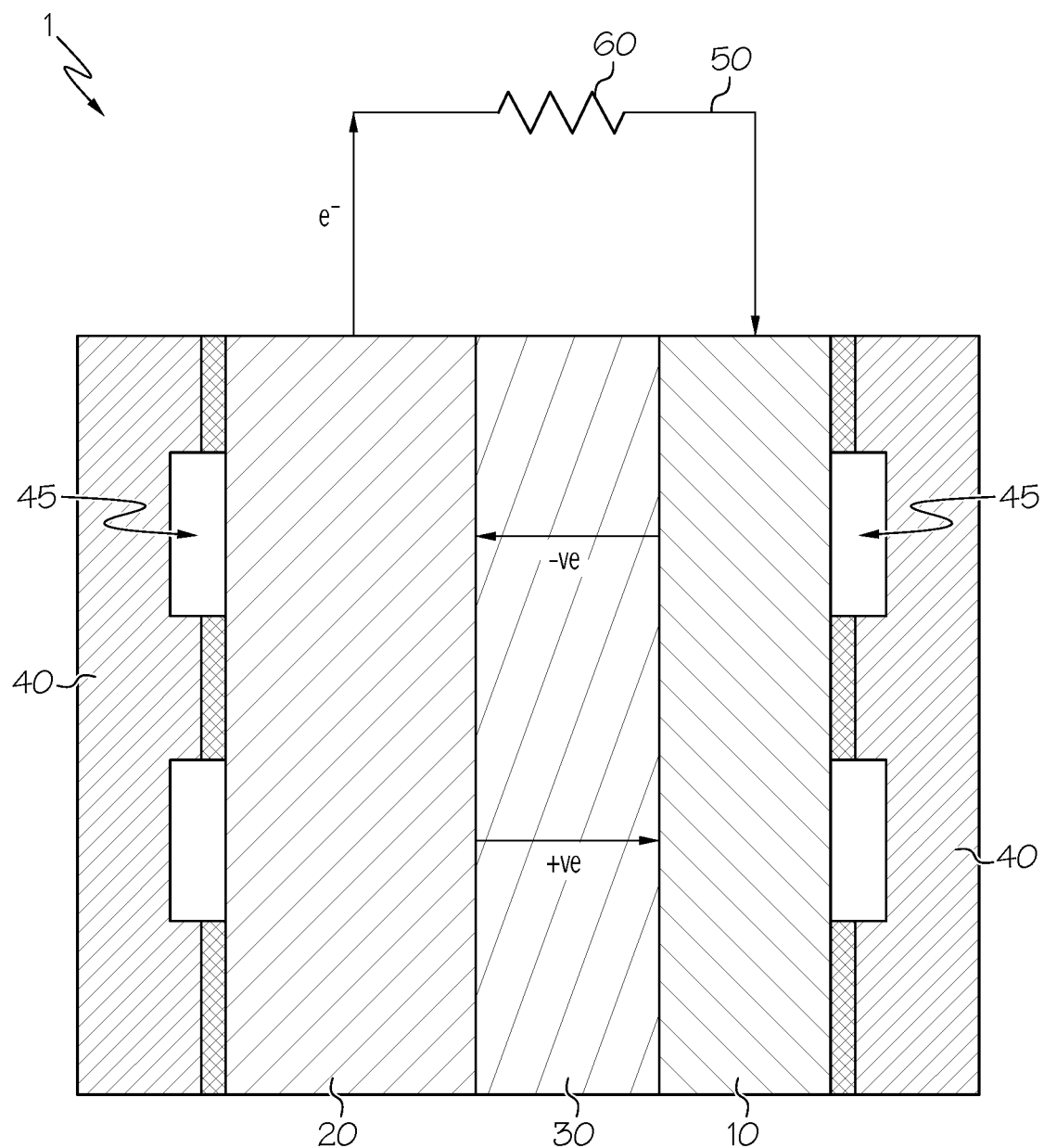
FIG. 1 illustrates a conventional SOFC using a solid anode.

Referring first to FIG. 1, a single fuel cell 1 of a conventional SOFC is shown in schematic cross-sectional view according to an embodiment of the prior art. In the traditional fuel cell 1, both a cathode 10 and an anode 20 and are made from porous oxide-based ceramic for the anode 20 and lanthanum strontium manganite (LSM) for the cathode 10) to facilitate the flow of an ionized reactant, as will be described in the next paragraph. A solid electrolyte (or more simply, electrolyte) 30 is placed between the cathode 10 and the anode 20. Interconnects 40 may be used to electrically tie various individual cells together (for example, in series), while electrical circuitry 50 can be coupled to the anodes 20 and cathodes 10 or the interconnect 40 to convey the electrical current that is generated in the cells through a suitable load 60. Likewise, absorbing layers (not shown) may be used to help remove sulfur that if left unabated may hinder proper anode 20 performance. Significantly, because fuel cell 1 operates at very high temperatures, the need for expensive noble metal-based catalysts is avoided, as both light and heavy hydrocarbon fuels can be directly reformed.

In operation, a gaseous form of fuel (also referred to herein as a fuel-bearing reactant) is fed into channels 45 that are formed in the interconnects 40 and pass adjacent the anode 20, while an oxidant (for example, air, also referred to herein as an oxygen-bearing reactant) is fed to comparable channels adjacent the cathode 10. Contact between the oxygen in the air and the cathode 10 causes the oxygen to ionize near the interfacial layer formed between the cathode 10 and the electrolyte 30. These negatively-charged oxygen ions −ve are conducted through the electrolyte 30 to reach the anode 20 where they can electrochemically react with the fuel (which may be one or more of $H_2$, $CO$, $CH_4$ or the like), forming one or more of $H_2O$ or $CO_2$. These reactions (using hydrogen as the exemplary fuel) are represented by formulaically as follows:

$$H_2 + O_2^- \rightarrow H_2O + 2e^- \quad (1)$$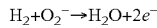

$$CO + O_2^- \rightarrow CO_2 + 2e^- \quad (2)$$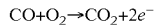

$$\tfrac{1}{2}O_2 + 2e^- \rightarrow O^{2-} \quad (3)$$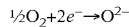

In an alternate configuration (not shown), the electrolyte 30 of fuel cell 1 may be configured to conduct hydrogen ions.

Figure 2A:
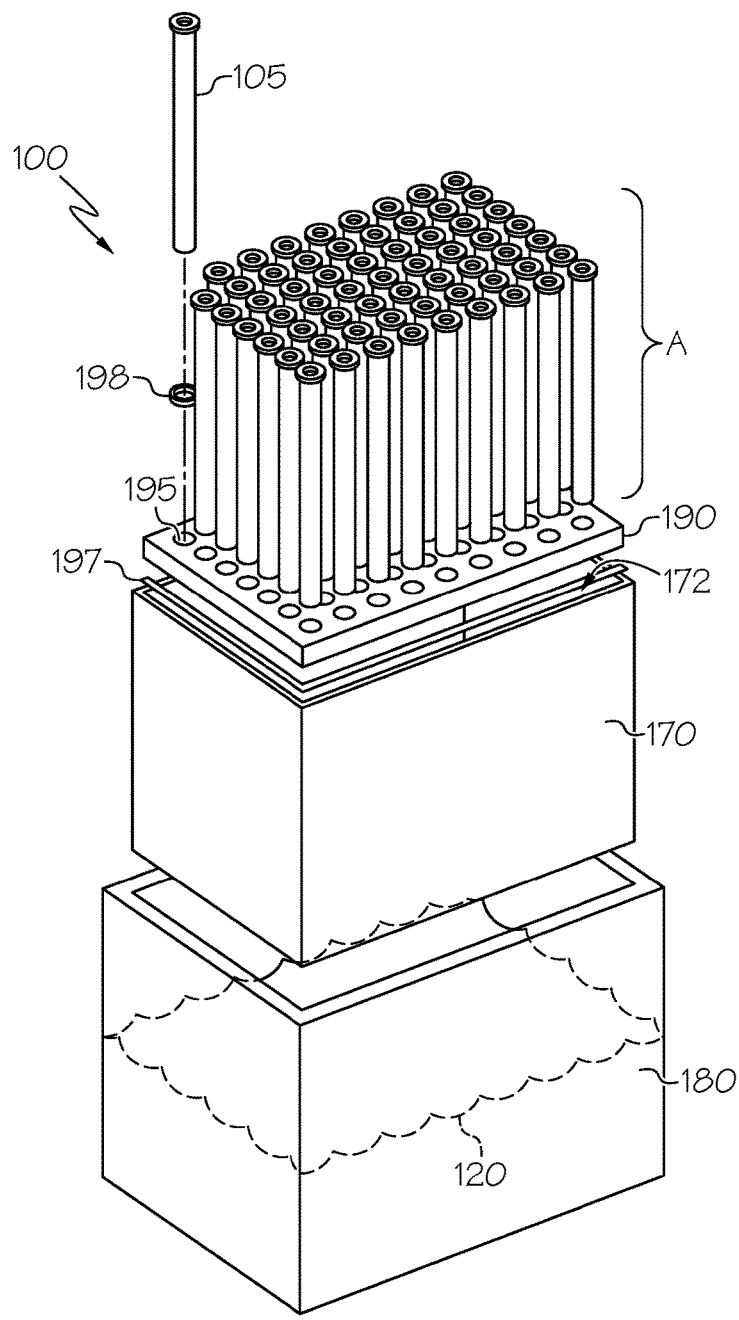
FIG. 2A illustrates a simplified exploded isometric view of an MMA-SOFC assembly according to the present disclosure.
Figure 2B:
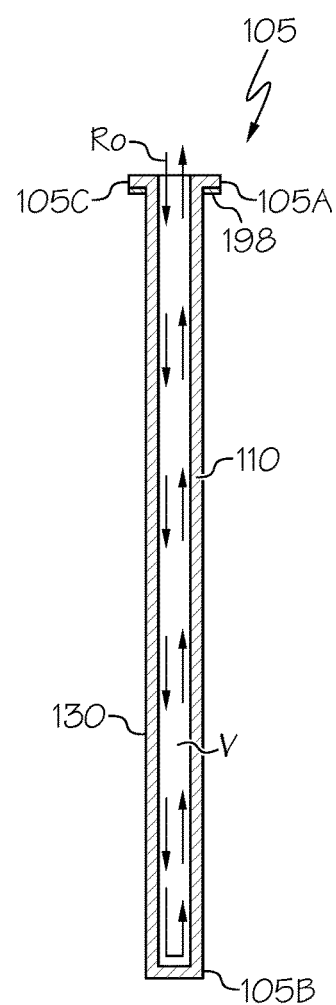
FIG. 2B illustrates a single half-cell from the MMA-SOFC assembly of FIG. 2A.
Figure 3:
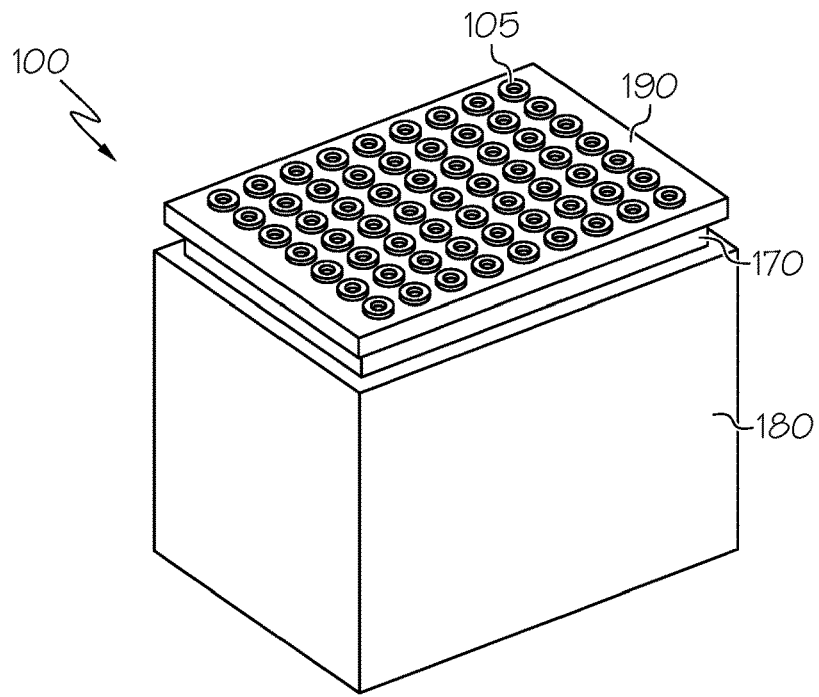
FIG. 3 illustrates the molten metal anode SOFC assembly of FIG. 2A in assembled form.

Referring next to FIGS. 2A, 2B and 3, one embodiment of an MMA-SOFC 100 (also referred to herein as fuel cell 100) according to the present disclosure is shown, where FIG. 2B shows with particularity a portion that is referred to herein as a half-cell 105. Each half-cell 105 is made up of cathode 110 with an electrolyte 130 in contact with one another; both are porous to promote the flow of oxygen that is ionized at the cathode 130 toward the anode 120 that will be discussed in more detail below. Unlike conventional fuel cell configurations—where numerous individual cells each with an anode, cathode and intermediate electrolyte are arranged in a stack or related construction to achieve higher power outputs—a complete MMA-SOFC 100 within the context of the present disclosure is the combination of a single anode 120 disposed about numerous half-cells 105 each of which is made up of the cathode 110 and electrolyte 130. In this way, having a single anode 120 promotes ease of construction.

For example, and not by way of limitation, the electrolyte 130 may be made from zirconia based electrolytes or ceria based electrolytes. In specific embodiments, the zirconia-based electrolyte may be selected from yttria stabilized $ZrO_2$ (YSZ), scandia stabilized $ZrO_2$ (ScSZ), calcia stabilized $ZrO_2$ (CSZ) and combinations thereof. Alternatively, the ceria-based electrolytes may comprise rare earth doped ceria. For example, the ceria-based electrolytes are selected from the group consisting of gadolinium doped ceria (GDC), yttria doped ceria (YDC), samarium doped ceria (SmDC) and combinations thereof.

When selecting the composition for the electrolyte 130, numerous factors should be considered, including (i) whether any possible chemical interactions with any of the electrodes may occur, as these may have a catastrophic effect on the fuel cell 100, (ii) the fuel cell 100 operating temperature range, and (iii) the ionic/electronic conductivity ratio value. As a result, combinations of two or more solid electrolytes 130 may be used to ensure these factors are met. For example, in cases where a non-stable solid electrolyte (which interacts with the molten metal anode 120) is necessary due to its remarkable ionic conductivity at the desired operating temperature, a thin coating of a chemically stable solid electrolyte may be used at the electrolyte/anode interface to avoid direct contact between the anode 120 and the solid electrolyte 130. The same technique can be used to block the electronic conductivity that a highly conductive mixed ionic-electronic solid electrolyte 130 may exhibit at the desired temperature range. In that instance, a thin coating of a purely ionic conductor (e.g. YSZ) may be beneficial.

On the other hand, any cathodic material that exhibits low $O_2$ (g) reduction overpotential at the higher operating temperature range while having negligible interactions with the electrolyte 130 could be used in the cathode 110. For example and not by way of limitation, the cathode 110 may be made up of lanthanum strontium manganite (LSM), yttria stabilized $ZrO_2$/lanthanum strontium manganite (YSZ-LSM), lanthanum strontium cobalt ferrite (LSCF) and combinations thereof. In an exemplary embodiment, the cathode 110 is made up of LSM.

Preferably, each half-cell 105 defines an elongate tubular structure as shown; as will be discussed in more detail below; not only does such a construction promote efficient fuel cell packing within MMA-SOFC 100, but also ease of removal for half-cell 105 maintenance. In one form, the dimensions of the half-cell 105 include a cathode wall thickness of about 5000 μm, an electrolyte wall thickness of about 500 μm, a height of about 500,000 μm, and an inner electrolyte diameter of about 50 mm. Additional ceramic-based tubular structure (not shown) may also be used to help promote a balance between molten metal surface tension and liquid head pressure as a way to ensure an ample quantity of the metal in the region immediately adjacent the electrolyte 130. It is preferable to have the electrolyte 130 be relatively thin in order to keep ionic transport resistance low as a way to increase operational efficiency. It is additionally preferable to have the electrolyte 130 material be configured to keep current leakage-related electrical conductivity low as well. It is further preferable that the electrolytes 130 have high ionic (for example, oxygen) conductivity and negligible chemical interactions with the anode 120. Suitable solid versions of these electrolytes 130 may be either purely ionic or mixed ionic-electronic.

Equations (1) through (3) above may be used to explain the general electrochemical operation of MMA-SOFC 100, where according to Eqn. (3) the cathode 110 reduces the $O_2$ in the inlet air stream, after which the oxygen ions migrate through the electrolyte 130 until they encounter the molten metal anode 120 that is made up of an oxidation region where the molten metal is oxidized to produce metal oxides and electrons. Within the present context, the term "oxidation region" encompasses the interface between the anode 120 and the electrolyte 130, as well as any region of the molten metal anode 120 wherein the oxygen ions may contact the molten metal. Thus, a generalized form of Eqn. (2) may be represented as follows:

$$xM(l)+yO^{2-} \rightarrow M_xO_y(l)+2ye^-.$$

MMA-SOFC 100 may additionally include a regeneration region to enable reduction of the metal oxides, as well as produce metal sulfides in situations where the molten metal reacts with sulfur-containing fuel. As used herein, the term "regeneration region" may encompass the contact area of the molten metal and sulfur-containing fuel. This regeneration may occur in a fuel contactor (not shown) that may be disposed within or otherwise formed as part of the container 180 that is discussed in more detail below. The less dense metal oxides migrate to the top of the molten metal bath where they are reduced by the fuel in the manner shown below that is a generalization of Eqn. (1) above.

$$aM_xO_y(l)+bC_mH_n \rightarrow cM(l)+dCO_2+eH_2O+fH_2$$

The formed metal species return to the bottom of the melt and complete the cycle. According to the above reaction, hydrogen may be formed depending on the fuel used. In the alternate (not shown), the hydrogen may be used in situ for further metal oxide reduction, or may be recycled for other use. It will be appreciated that when sulfur is present in the fuel, metal species react with sulfuric components (CHS) in presence of hydrogen to form metal sulfide species and a so-called "upgraded" fuel; this is depicted as $C_mH_z$ in the following reaction.

$$aM(l)+bC_mH_nS_k+cH_2 \rightarrow dM_xS_y(l)+eC_mH_z$$

This upgraded fuel can be used in situ for further metal oxide reduction such as that depicted in the generalization of Eqn. (1) from above. While the person of ordinary skill in the art would consider various fuels to be suitable, the sulfur-containing fuel could also be a hydrogen fuel (as discussed above), as well as a carbon fuel, hydrocarbon fuel, hydrogen sulfide, low value solid sulfur and sulfones and sulfoxides originating from oil and gas and mixtures thereof. Without being bound by theory, carbon-containing fuels may be desirable since the reduction reaction with carbon containing fuel desirably has a greater free energy.

After oxidation occurs in the molten metal anode 120, the molten metal may be transferred to a separate fuel contactor that delivers fuel to the metal oxides-containing molten metal. In one such form, ceramic or metallic porous tubing that preferentially permits one-way diffusion may be used. For example, in case of a gaseous fuel, only the gaseous species can go through the pores (fuel inwards-diffusion and products back-diffusion). In the case of solid fuels, as well as gas/liquid fuels, an opened-at-will container could be used instead of a porous tube. Optionally, in case melt flow rates are inadequate, a pumping system (not shown) could be also used, as well as a stirring system for the acceleration of the molten metal oxide diffusion and related electrochemical reactions.

Referring with particularity to FIGS. 2A and 3, arrays A of these half-cells 105 may be placed in a furnace 170 which is in turn nested within a generally fluid-tight container that is in the form of tank 180. A lid 190 with arrayed apertures 195 may be used to cover the opening in either the furnace 170 or tank 180, while high temperature metal seals (shown presently in FIG. 2A as a pair of L-shaped metal gasket-like high temperature rigid inserts 197 disposed along the contacting surface between furnace 170 and lid 190, and in FIGS. 2A and 2B as a ring 198 placed between each half cell proximal end 105A and its respective aperture 195) to ensure that the containment of the molten metal anode 120 remains substantially leak-free. In a preferred form, the small volumetric space (i.e. in the field 172) above the molten metal anode 120 surface and the inner surface of the lid 190 will have an inert gas environment. In an optional form, the container 180 includes a thermal insulator disposed adjacent an exterior surface thereof to form a board or blanket-like isolation of the ambient environment from high-temperature molten metal anode 120. In one preferred form, the board or blanket type thermal insulation has a thickness of about 50 mm with low thermal conductivity of 0.15 W/mK; this should allow the molten metal to achieve its desirable operating temperature of up to 1300° C. (or 1573 K) while keeping the portion of the MMA-SOFC 100 that is exposed to the remainder of the APU (which is discussed in more detail below) to low enough temperatures to avoid damage to the APU components.

As can be seen, the arrayed apertures 195 are of a size and shape to accept the various half-cells 105. Significantly, the open-ended design between the half-cells 105 and the perforate lid 190 with apertures 195 will allow for simple insertion and withdrawal of each half-cell 105 as part of a removable modular assembly; this will be valuable in promoting ease of maintenance for not just the half-cells 105, but also heating elements or other components disposed within the tank 180. In this way, one or more of the half-cells 105 may be easily accessed from above and grasped along the flanged surface (also referred to herein as a flange 105C) such that in the event one or more of the half-cells 105 need to be serviced or replaced, the releasable coupling between them and the lid 190 promotes ease of half-cell 105 removal and insertion. In this way, the lid 190 and half-cells 105 make up a modular assembly where at least the half-cells 105—and in some configurations the lid 190 as well—are removable from the container without requiring the use of complex tools. While it will be understood that in a general sense that virtually any joined components with a larger assembly can be releasably coupled to one another, within the present context it is more restrictive in that it refers to having the half-cells 105 be accepted within or disposed on the lid 190 for insertion or removal without the need for tools, related complex assembly/disassembly procedures or damage to one or both components. In another embodiment, this modular assembly may also be combined with one or more of the seals 197, 198 as mentioned above to further promote fluid isolation of the molten metal anode 120 from the remainder of the MMA-SOFC 100 or the ambient environment.

Unlike the fuel cell 1 of FIG. 1 where the anode 20 is made from metallized porous ceramic (cermet), the anode 120 is configured to be a metal that can occupy a molten state during operation of the MMA-SOFC 100. Because the anode 120 may exist in a fluid state during MMA-SOFC 100 operation, not only is the MMA-SOFC 100 simplified relative to conventional fuel cells by having a single anode 120 placed in electrochemical cooperation with numerous cathodes 110 and electrolytes 130, such anode 120 can be designed as a non-structural component, permitting greater design flexibility in the construction of the APU 280 that will be discussed in greater detail below. For example, this type of design makes it possible to isolate from the rest of the MMA-SOFC 100 structural changes that may take place in the anode 120 during the temperature or chemical changes that accompany MMA-SOFC 100 operation, which in turn allows replacement of the anode 120 rather than the more rigid, fixed components within MMA-SOFC 100. In one form, the anode 120 may exhibit composite-like properties where the metal may be a tin (Sn) or a tin based alloy that can be infused in a ceramic matrix. One desirable attribute is that the material making up anode 120 exhibits high oxygen ion-mobility. Significantly, MMA-SOFC 100 using a molten metal anode 120 is compatible with known forms of carbon-based fuels, such as low-sulfur diesel that is readily available through an existing fuel infrastructure. Other metals may be used as well. For example, anode 120 may use molten antimony (Sb), where high electric power densities (exceeding 300 mW/cm$^2$ at 973 K) may help to reduce MMA-SOFC 100 size. Likewise, antimony may be used in mixture with various other metals including—in addition to tin—bismuth (Bi), indium (In) and lead (Pb). Other metal combinations may be used as well, including aluminum (Al), gallium (Ga), thallium (Tl) and polonium (Po), as well as the adjacent transitional metals IB and IIB, such as silver (Ag), mercury (Hg) or cadmium (Cd). In one preferred form, the metal or combination of metals used for anode 20 are designed to have a melting point below about 750° C. (1023 K). In all cases, the anode 120 may accordingly use metals having the higher tendency to oxidize; these are preferentially oxidized, allowing the MMA-SOFC 100 to behave much as it would with that metal in pure form. In cases where the oxide formed from this preferential oxidation has a higher melting point than the operating temperature of the cell (for example, $SnO_2$ with a melting temperature of about 1903 K, or $In_2O_3$ with a melting temperature of about 2185 K in cells operating at around 1000 K or less), the oxide may deposit on the interface between the electrolyte 130 and anode 120, resulting in degradation of cell performance. In the Sb—Pb system, although PbO melts at a temperature about 1161 K) that is significantly greater than the 973 K operating temperature of the MMA-SOFC 100, the antimony is preferentially oxidized, allowing each half-cell 105 to behave similarly to if the anode 120 were using pure antimony. As shown below in Table 1, antimony is a suitable choice, as its melting points are relatively uniform whether it is in metal, oxide or sulfide form.

TABLE 1

| Metal | Phase | | |
|---|---|---|---|
| | metallic (° C.) | oxide (° C.) | sulfide (° C.) |
| Sb/Sb$_2$O$_3$/Sb$_2$S$_3$ | 630 | 656 | 550 |
| Sn/SnO/SnS | 232 | 1080 | 882 |
| Bi/Bi$_2$O$_3$/Bi$_2$S$_3$ | 271 | 817 | 775 |
| Te/TeO$_2$ | 450 | 732 | |
| Tl/Tl$_2$O/Tl$_2$S | 304 | 596 | 448 |

It may be desirable to include a sulfation region for the MMA-SOFC 100. As used herein, "sulfation region" encompasses the contact area of the molten metal and sulfur-containing fuel to further produce metal sulfides, which may then be electrochemically oxidized to generate electricity. This sulfation may occur in a fuel contactor in a manner similar to that used for regeneration as discussed above. As described above, these metal sulfides may be electrochemically oxidized in situ to further generate electricity. In an alternative embodiment, the sulfation region may be included separately in a fuel contactor that is in fluid communication with the MMA-SOFC 100. Like the fuel contactor used in the metal/metal oxide cycle discussed above, such a fuel contactor may include porous tubing for selective (or one-way preferential) fuel diffusion.

As described herein, the molten metal of the anode 120 may essentially serve as a sulfur carrier/capturing agent; however, in case of small electrocatalytic activity, a conventional solid porous metal/metal oxide anode (not shown) may also be used to further enhance the electrochemical oxidation rate. For example, including a second solid metal anode (not shown) between the molten metal anode 120 and the electrolyte 130 may help promote the reduction of metal oxide species to metal species with new metal sulfide species being formed at this second solid metal anode. The latter will then be oxidized electrochemically by oxygen ionic species supplied from the electrolyte 130, producing electricity and gaseous $SO_2$. Various metals suitable for oxidation may be utilized in the second solid metal anode, such as a metal or ceramic-metallic material with lower susceptibility to sulfation (i.e., a less stable metal sulfide) than the metal of the molten metal anode 120; examples include iron (Fe), cobalt (Co), nickel (Ni), copper (Cu) and combinations thereof. In another embodiment, such a second solid metal anode may use Fe, while Sb may be used in the molten metal. Other compositional combinations of the second solid metal anode and the molten metal anode 120 are also within the scope of the present disclosure.

As previously discussed, metal oxides may also be formed electrochemically, in parallel with metal formation in the anode 120. If metal oxide species are undesirable in the melt, then a sacrificial reducing agent (SRA, not shown) may be used downstream of the MMA-SOFC 100. In one embodiment, the SRA may be a graphite rod to reduce metal oxide species to metal and $CO_2$. In such circumstances, it may additionally have an adjacent opening to purge $CO_2$ from the system. In another embodiment, the SRA may be a metal (in solid phase) with a higher susceptibility to oxidation than the metal that makes up the molten metal anode 120. A measure for susceptibility to oxidation of metals can be the metal oxide formation free energy. For example, in the case of Sb as being the molten metal anode 120, the metal of the SRA could be Fe, zirconium (Zr), manganese (Mn), tantalum (Ta), silicon (Si) or titanium (Ti) and combinations thereof. Such a part is understood to be sacrificial in nature in that it will have a limited lifetime and need to be replaced when fully oxidized.

$SO_2$ removal and treatment equipment may be included downstream of the MMA-SOFC 100. For example, the $SO_2$ removal equipment may comprise one or more units such as a wet scrubber unit, a spray-dry unit, a wet $H_2SO_4$ processing unit, a $SNO_X$ flue-gas desulfurization unit and combinations thereof. In an alternate form, a catalytic unit (for example, one similar to the catalytic part of a Claus unit) may be incorporated downstream of the anode 120 to convert $H_2S$ to elemental sulfur. Generally, such a unit would cause gaseous $H_2S$ to undergo a substoichiometric combustion at a temperature of about 1000° C. to form gaseous $SO_2$ as shown below.

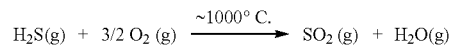

This in turn reacts with gaseous $H_2S$ to form elemental sulfur as shown below to remove the $SO_2$.

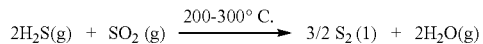

$$2H_2S(g) + SO_2(g) \xrightarrow{200\text{-}300°\text{ C.}} 3/2\, S_2(l) + 2H_2O(g)$$

Referring with particularity to FIG. 2B, the tubular nature of the cathode 110 and electrolyte 130 that make up each half-cell 105 resembles a test tube. The cathode 110 forms a volume V within the tube's inner surface that defines a reactant flow field channel that extends between an inlet at the proximal end 105A and a closed bottom or distal end 105B. The flange 105C is formed around the reactant inlet at the proximal end 105A so that the half-cell 105 can be supported on lid 190 through the respective apertures 195. The flow field defined by volume V is configured to direct a stream of oxygen-bearing reactant $R_O$ from proximal end 105A, through the cathode flow field and out of the half-cell 105 through the proximal end 105A. Because of the closed distal end construction of each half-cell 105, it will be advantageous to have the oxygen-bearing reactant introduced adjacent the closed distal end 105B (such as through an elongate tube (not shown) that is sized to fit within the volume V) rather than the open proximal end 105A in order to promote the continued flow (under pressurized condition) and avoidance of fluid stagnation.

Referring again to FIG. 2A, a field 172 is a defined space adjacent to the array A of tubular half-cells 105 so that when the anode 120 is in the molten state, it acts as a bath that is formed around the half-cells 105 to immerse them, thereby completing MMA-SOFC 100 by having both positive and negative electrodes. Such immersion may be partial, complete or anywhere in-between, while the anode 120 bath defined by the field 172 may take place either directly in the furnace 170 (in configurations where the furnace 170 is nested within a larger tank 180, as shown) or directly in tank 180 where the furnace 170 acts remotely through heating elements, heat exchangers or the like). There may also be circumstances where the anode 120 bath may be disposed in either or both the furnace 170 and container 180 (the latter of which is shown), as well as between these two vessels. Carbonaceous fuel (for example, diesel fuel) is mixed with the anode 120 under temperature as high as 800° C. (i.e., 1073 K)) in order to ensure that the anode 120 is in molten form. It will be appreciated that in configurations where different combinations of metals (such as those mentioned above) are used, the local temperature generated by furnace 170 or other heating device may be adjusted accordingly in order to ensure that the anode 120 is in a suitable molten state during operation. In addition to the choice of metals mentioned above, a sequestering agent may be dispersed within the anode 120 to help captures $CO_2$ and $SO_2$; such sequestering may help reduce unwanted emissions, as well as reduce the presence of sulfur that would otherwise act as a poison around the anode 120.

As mentioned above, furnace 170 may be configured as various discreet resistive or other heating elements that may be placed inside or outside of tank 180, and as such may be in direct or indirect heat exchange relationship with the individual half-cells 105 and surrounding anode 120 in order to achieve such selective heating. In constructions where the heating is provided remotely (such as by the use of heating elements with or without companion heat exchange conduit or related circuitry, none of which is shown) there is no need for the fluid-containing redundancy provided by the box-like furnace 170 structure. It will be appreciated that all of these forms of are within the scope of the present disclosure, and as such may all be subsumed under the definition of the furnace 170. Accordingly, within the present context, it will be appreciated that furnace 170 is any device that upon operation provides sufficient heat to the MMA-SOFC 100 to ensure that the anode 120 is in a molten metal state during normal modes of operation. Regardless of the furnace configuration, a thermostatic controller (not shown) may be used to maintain the MMA-SOFC 100 at a preferred operating temperature such as that required to ensure that the anode 120 remains in a molten state during operation.

Figure 4:
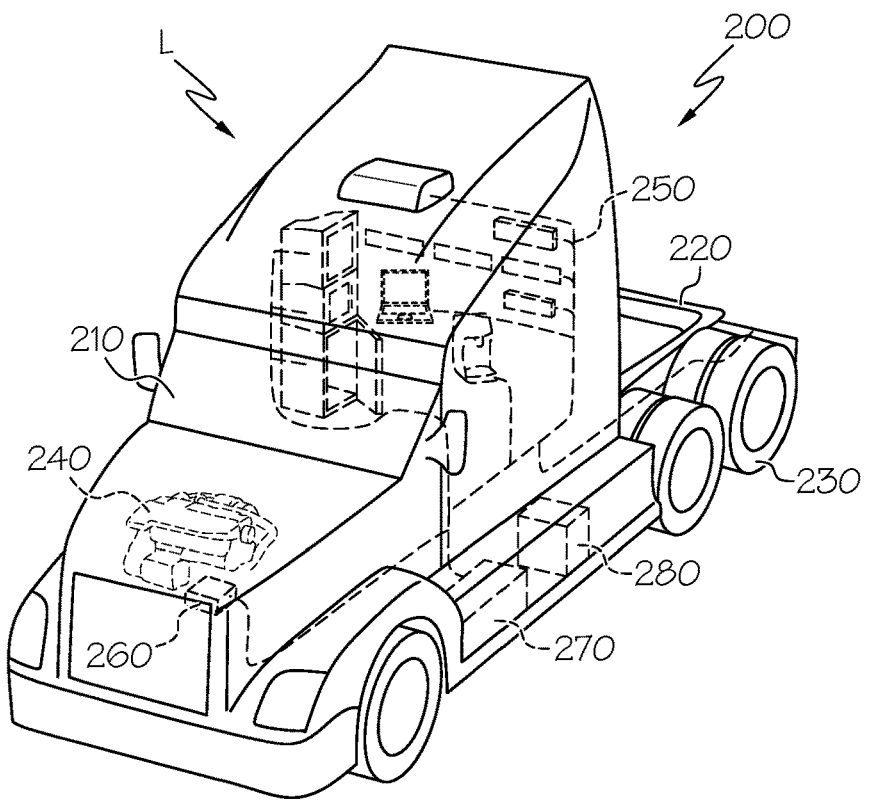
FIG. 4 illustrates the details of a notional placement of the MMA-SOFC assembly of FIG. 3 as an APU situated on the tractor of the tractor-trailer.

Referring next to FIG. 4, a vehicle 200 in the form of a tractor of a tractor-trailer rig is shown. In addition to cab 210 placed upon a railed platform or chassis 220 that is in turn supported by wheels 230 the movement of which can be controlled by a steering wheel, accelerator, brakes or related guidance apparatus, the vehicle 200 includes a drivetrain that receives rotary mechanical power from a main engine 240 that serves as a motive power unit. In a preferred form, the main engine 240 is a diesel engine that receives diesel fuel from a fuel tank (not shown). Cab 210 includes numerous electrically-powered devices, including lighting, a computer, television, radio, air conditioner, microwave oven, refrigerator, fans or the like, all connected via electrical circuitry 250 that in one form may receive electric current from a generator or alternator 260 that is rotationally cooperative with the main engine 240, or from one or more chassis-mounted batteries 270 that are used to providing main cranking power during startup of main engine 240.

An APU 280 mounted to the chassis 220 may also be used to provide electrical power to some or all of these devices, as well as heat for driver comfort in climates where the cab 210 is exposed to cold ambient temperatures. Moreover, the APU 280 (as well as a generator or alternator 260) may be used to recharge battery 270; such recharging may take place regardless of whether the main engine 240 is in operation, whereas the generator or alternator 260 is only operable during the times when the main engine 240 is running. In one preferred form, APU 280 is fluidly connected to the same fuel supply (not shown) as the main engine 240 so that it can provide current through electrical circuitry 250 to power the various devices with the cab 210 make up a significant portion of a load L.

As shown, the APU 280 is mounted on the chassis 220 such that it is directly behind the cab 210. Unlike conventional tractor-trailer APUs—where the primary source of power is a small diesel engine—the source of power for the APU 280 according to an aspect of the present disclosure is the MMA-SOFC 100 discussed above. Additional components (not shown) that make up the balance-of-plant (BOP) of APU 280 include a heating system, an air conditioning system with a compressor, evaporator, condenser and associated conduit and processor-based controller; As will be appreciated by those skilled in the art, some of the separate heating and cooling functions may be integrated as part of a larger climate control system, also referred to as a heating, ventilation and air conditioning (HVAC) system in order to provide warm air or cool air to the cabin 210, depending on the need. Within the present context, the term "climate control system" is meant to encompass one or both of the heating and air conditioning systems, and that a corresponding discussion thereof will be apparent from the context. In addition, APU 280 includes a motor/generator, generator or alternator system (with or without an inverter) and a processor-based controller along with corresponding electrical circuitry to permit an individual to selectively operate the various components from the cab 210 as the need arises. Many or all of these components that make up APU 280 BOP are preferably housed in a container or suitable enclosure and mounted to one of the frame rails or other chassis members 220 as mentioned above. Additionally, APU 280 may be used to provide electrical power motive power components within vehicle 200, such as to warm the block of the main engine 240 or the fuel being delivered to the main engine 240 to assist in cold-weather starting.

In a preferred form APU 280 is sized to provide about 10 kW of power output. Furthermore, while it can operate on a variety of fuels (including hydrogen, natural gas or the like), in one preferred form the APU 280 can use the native diesel fuel supply that is already present on the vehicle 200 and being used to provide fuel to the main engine 240. By converting the fuel directly to electrical energy, without typical thermal-mechanical conversion found in an engine, the maximum Carnot efficiency inherent in all ICEs no longer applies, thereby allowing far higher efficiencies to be achieved. In addition to the increased efficiency, lower emissions and reduced operating noise are also features of the APU 280.

For the purposes of describing and defining features discussed in the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters. It is likewise noted that recitations herein of a component of the present disclosure being "configured" or "programmed" in a particular way, to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining features discussed in the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is noted that terms like "preferably", "generally" and "typically" are not utilized herein to limit the scope of the claims or to imply that certain features are critical, essential, or even important to the structures or functions disclosed herein. Rather, these terms are merely intended to highlight alternative or additional features that may or may not be utilized in a particular embodiment of the disclosed subject matter. Likewise, it is noted that the terms "substantially" and "approximately" and their variants are utilized herein to represent the inherent degree of uncertainty that may be attributed to any quantitative comparison, value, measurement or other representation. As such, use of these terms represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A vehicular power system comprising:
  a motive power unit; and
  an auxiliary power unit comprising:
    a container;
    a modular assembly configured to be selectively received within the container, the modular assembly comprising:
      a molten metal anode solid oxide fuel cell comprising:
        a plurality of half-cells each comprising a cathode and a solid electrolyte; and
        a liquid bath anode into which the plurality of half-cells are at least partially submerged such that upon operation of the auxiliary power unit, an oxygen-bearing reactant flows through the plurality of half-cells to electrochemically react with at least one of a molten metal and a fuel-bearing reactant that are contained within the liquid bath anode; and
      a perforate lid defining a plurality of apertures therein such that each aperture defined in the perforate lid forms a releasable coupling with a corresponding one of plurality of the half-cells to permit the corresponding one of the plurality of half-cells to be individually removable from the modular assembly;
    a first seal disposed between the perforate lid and the container;
    a plurality of second seals, wherein respective ones of the plurality of second seals are disposed between a half-cell of the plurality of half-cells and the perforate lid;
    an inert gas environment formed by cooperation between the perforate lid, the container, the plurality of half-cells, the first seal and the plurality of second seals, the inert gas environment defining a volumetric space between the liquid bath anode and the perforate lid;
    a furnace nested within the container and thermally cooperative with the molten metal anode solid oxide fuel cell such that upon operation of the furnace, the molten metal in the bath is maintained in a substantially molten state; and
    electrical circuitry cooperative with the molten metal anode solid oxide fuel cell such that an electric current produced by the molten metal anode solid oxide fuel cell may be delivered through the electrical circuitry to a vehicular load.

2. The vehicular power system of claim 1, wherein the molten metal is selected from the group consisting of tin, antimony, bismuth, tin and combinations thereof.

3. The vehicular power system of claim 1, wherein the furnace is disposed between the container and the molten metal anode solid oxide fuel cell.

4. The vehicular power system of claim 3, further comprising a thermal insulator disposed adjacent a surface of the container to reduce thermal communication between the liquid bath anode and an ambient environment proximate the auxiliary power unit.

5. The vehicular power system of claim 1, wherein the cathode and the electrolyte of each half-cell define an elongate tubular structure with a closure at a distal end thereof that is submerged within the liquid bath anode and a proximal end thereof defining an aperture that is not submerged within the liquid bath anode but fluidly cooperative with the oxygen-bearing reactant.

6. The vehicular power system of claim 5, wherein the elongate tubular structure defines a flanged surface adjacent the proximal end.

7. The vehicular power system of claim 1, wherein the load is selected from the group consisting of a vehicular climate control system and the motive power unit.

8. The vehicular power system of claim 1, wherein the liquid bath anode further comprises a sequestering agent disposed therein.

9. The vehicular power system of claim 1, wherein the auxiliary power unit further comprises at least one of (a) an electrical generator or alternator and (b) a processor-based controller to regulate the flow of the electric current to the vehicular load through the electrical circuitry.

10. The vehicular power system of claim 1, wherein the first seal comprises at least one L-shaped seal.

11. The vehicular power system of claim 1, wherein the second seal comprises at least one ring-shaped seal.

12. The vehicular power system of claim 1, wherein the first seal comprises at least one L-shaped seal and the second seal comprises at least one ring-shaped seal.

13. A method of providing auxiliary power to a vehicle that comprises a motive power unit and an auxiliary power unit, the method comprising:

operating a furnace to provide heat to the auxiliary power unit that comprises a container that is mounted to the vehicle and a modular assembly that is received within the container through an open upper surface that is defined in the container, the modular assembly comprising:
  a molten metal anode solid oxide fuel cell comprising a plurality of half-cells each comprising a cathode and a solid electrolyte, and a liquid bath anode into which the plurality of half-cells are at least partially submerged;
  a perforate lid defining a plurality of apertures therein such that each aperture defined in the perforate lid forms a releasable coupling with each of the plurality of the half-cells;
  a first seal disposed between the perforate lid and the container;
  a plurality of second seals, wherein respective ones of the plurality of second seals are disposed between a half-cell of the plurality of half-cells and the perforate lid; and
  an inert gas environment formed by cooperation between the perforate lid, the container, the plurality of half-cells, the first seal, and the plurality of second seals, the inert gas environment defining a volumetric space between the liquid bath anode and the perforate lid;
passing an oxygen-bearing reactant through a plurality of half-cells and into the liquid bath anode;
oxidizing at least a portion of the molten metal with the oxygen-bearing reactant;
reducing the oxidized molten metal with a fuel-bearing reactant that is present within the liquid bath anode; and
supplying electrical current produced by the molten metal solid oxide fuel cell to at least one of an electrical load and a climate control system situated on the vehicle.

14. The method of claim 13, wherein operation of the auxiliary power unit takes place during periods when the motive power unit is not being operated.

15. The method of claim 13, wherein the fuel-bearing reactant used in the auxiliary power unit is the same as that used for the motive power unit.

* * * * *